June 19, 1962  G. R. LAWSON  3,040,148
RADIANT HEAT ROOM THERMOSTAT
Filed June 16, 1959  2 Sheets-Sheet 1
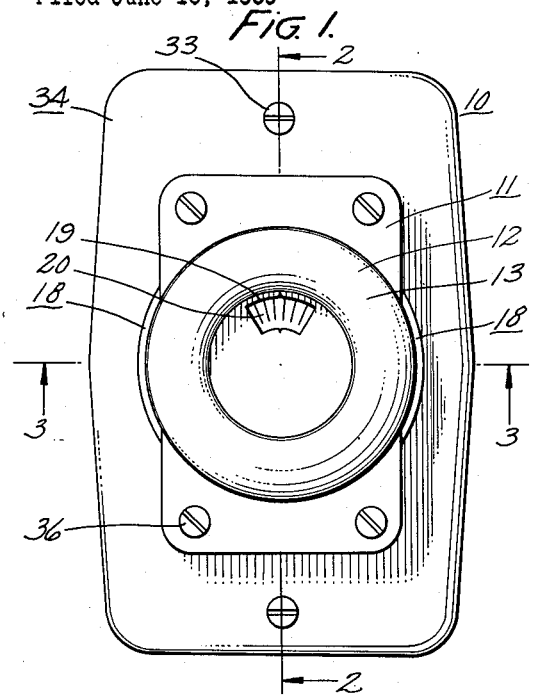
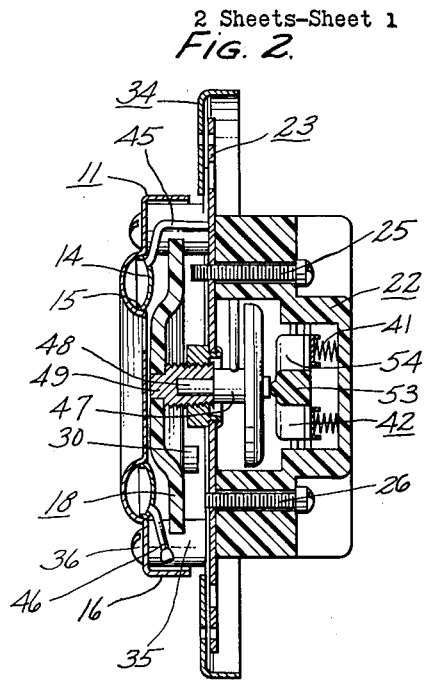
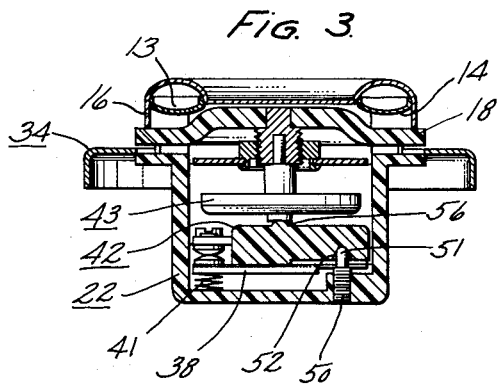
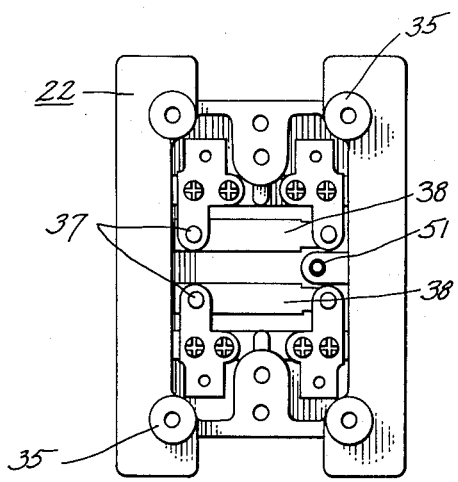
Inventor:
Gustaf R. Lawson
by Richard L Caslin
His Attorney

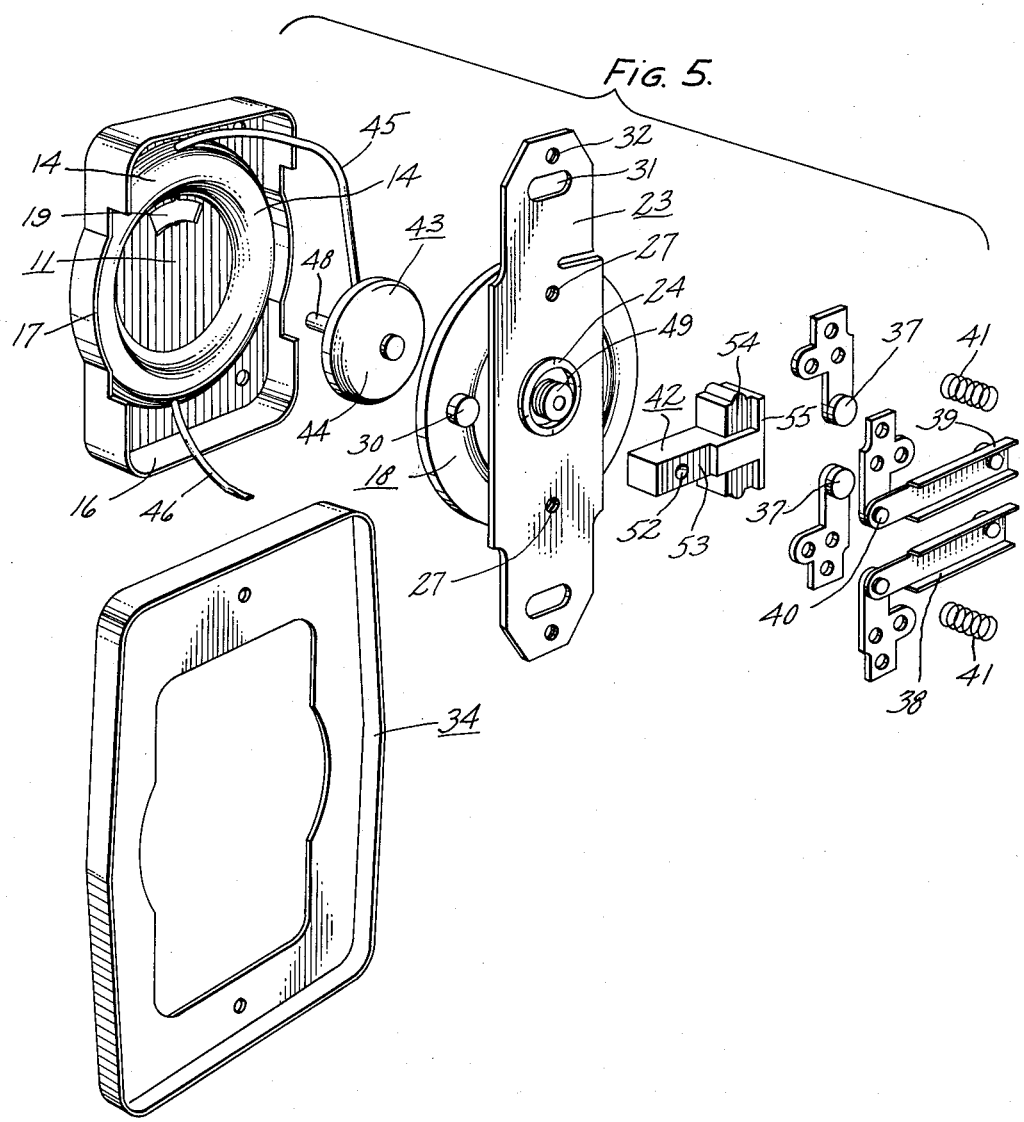

United States Patent Office 3,040,148
Patented June 19, 1962

3,040,148
RADIANT HEAT ROOM THERMOSTAT
Gustaf R. Lawson, West Warwick, R.I., assignor to General Electric Company, a corporation of New York
Filed June 16, 1959, Ser. No. 820,697
6 Claims. (Cl. 200—140)

The present invention relates to a room or wall thermostat which is designed especially for electric heating installations where high sensitivity to radiant heat is an important factor in the full realization of the advantages of this means of heating.

In the past, the majority of room thermostats have included a bimetallic strip or coil enclosed in a ventilated housing that was mounted on the outer surface of the wall. Such a ventilated housing permits the transfer of heat between the ambient air mass and the temperature sensitive element by convection or circulation, but unfortunately shields the element from heat absorption by direct radiation from the heat source.

This invention is designed primarily for use with an electric radiant heating system using either electric baseboard heaters or small diameter heating wires embedded in plaster and laminated gypsum wallboard ceilings. The comfort requirements of individuals dictate that the temperature sensitive element of the thermostat be exposed to the source of radiant heat so that it can best detect and correct the variations in temperature conditions. Anyone who has stood near a roaring fire in a fireplace will readily appreciate that an individual may be uncomfortably warm when receiving too much direct heat by radiation even thought the temperature of the surrounding atmosphere is at a temperature lower than that usually thought necessary. If the individual standing in front of the fire were shielded from its radiant heat energy he would be much colder. Then if the individual were replaced by a ventilated-housing thermostat, the thermostat would be ordering more heat from the heating system than would be necessary for personal comfort because the thermostat would be relatively cold.

The principal object of the present invention is to provide a room thermostat that is acutely sensitive to variations in the delivery of radiant heat, this sensitivity being due to the presence of a reservoir of thermally sensitive liquid with at least part of one wall of said reservoir being part of the surface area of the faceplate of the thermostat.

A further object of the present invention is to provide a room thermostat that is highly sensitive to radiant heat and has a temperature sensitive element comprising a liquid filled reservoir fixedly mounted over the face of the thermostat with a high ratio of surface area to volume for maximum sensitivity.

A still further object of the present invention is to provide a room thermostat for a radiant heating system with a novel slow make and break double pole switch mechanism with movable contacts of rigid construction to prevent the tendency of the contacts to chatter at the instant the circuit is opened.

A preferred embodiment of the present invention comprises a thermostat housing that incorporates a slow make and break switch structure with a single throw, double pole movement. There are two fixed contacts that are connected to the line and two movable contacts that are joined to the load. A fluid-filled expansible element with a manual control knob is installed in the housing in combination with a rocker arm. This rocker arm is fulcrumed near one end on a calibrating screw that extends through the bottom wall of the housing. The other end of the arm bears against the two movable contact blades, while the force exerted by the expansible element is applied near the last-mentioned end of the rocker arm. The movable contact blades are of channel shape for most of their length so that they act as rigid members except at the pivots where the blades are hinged to the housing. The feature which sets this switch mechanism apart from the prior art is in making the movable contact blades extremely rigid and by properly choosing the lever ratios so that there will be a low ratio of contact blade length to force arm length in the order of between 1:1 to 5:1.

The principal point of novelty is in the design of an integral faceplate mounted over the front of the thermostat to support a fluid-filled reservoir that serves as the temperature sensitive element and reacts quickly to variations in the amount of the radiant heat energy to which the element is exposed. A short length of flexible capillary tubing connects the reservoir with the previously mentioned expansible element that acts upon the rocker arm of the switch mechanism. In operation, a rise in temperature of the surface of the faceplate will cause the liquid in the reservoir to expand, thereby increasing the liquid pressure within the expansible element and exerting a greater force against the rocker arm which bears on the contact blades to open the circuit and shut off the current to the electric heating system.

My invention will be better understood from the following description taken in connection with the accompanying drawings and its scope will be pointed out in the appended claims.

FIGURE 1 is a front view of a room thermostat embodying the present invention showing an annular-shaped reservoir in a faceplate covering the front of the thermostat.

FIGURE 2 is a vertical cross-sectional view taken on the line 2—2 of FIGURE 1.

FIGURE 3 is a transverse cross-sectional view taken on the line 3—3 of FIGURE 1 and showing the interrelation between the movable and fixed contacts, the rocker arm and its fulcrum, and the fluid-filled expansible element that is carried by a control knob.

FIGURE 4 is a plan view of the recessed base for enclosing the switch mechanism, with the rocker arm and expansible element removed to illustrate the relative positions of the contacts.

FIGURE 5 is an exploded view of the thermostat minus the recessed base and showing the details of the various parts of the switch mechanism and the faceplate with the built-in reservoir.

Referring in detail to the drawing and in particular to FIGURE 1, 10 represents a room thermostat with a fixed faceplate 11 and an annular-shaped embossment 12 stamped in the faceplate as part of a liquid-filled reservoir 13. This reservoir 13 is completed as shown in FIGURES 2 and 3 by closing the back side of the annular embossment with a thin ring member 14 that has a channel-shaped transverse cross-section. The channel shape has side flanges 15 which are welded or otherwise fastened within the concavity of the annular embossment 12. This ring 14 appears as an annular embossment on the back side of the faceplate 11 as seen in FIGURE 5.

The four sides of the faceplate 11 are folded back in a drawing operation to form a continuous flange 16. Notches 17 are cut in two of the opposite sides of the flange 16 so that a control knob 18 may fit within the back of the faceplate. The diameter of the knob 18 is slightly larger than the diameter of the reservoir 13 so that the opposite sides of the knob will be accessible from the front of the thermostat as best seen in FIGURE 1. A small window 19 is cut in the faceplate inwardly of the reservoir 13. The purpose of the window is to gain a view of the underlying control knob 18 so that the indicia 20 that is marked on the knob may be observed for setting the proper temperature level of the thermostat.

The major portion of the thermostat 10 is located within a housing that is formed by a recessed base member 22 and a mountnig strap 23. The base is molded of a suitable electrical grade phenolic compound, while the strap 23 is a metal plate that closes the front opening in the recessed base. An understanding of the mounting strap 23 can be obtained by referring to FIGURE 5. It is a flat plate with a central opening in which is fastened an internally threaded bushing 24. This bushing serves as the adjustable mounting means for the control knob 18. The mounting strap 23 is fastened to the base 22 by means of two screws 25 and 26 which extend through the base from the back and are threaded into tapped openings 27 of the strap. The top screw 25 is longer than the other screw to serve as a positive stop for the turning movement of the control knob 18. This is possible because the back side of the knob has a lug 30 which is adapted to engage screw 25 during the travel of the knob to limit the rotation of the knob 18 to slightly less than 360°. Each extremity of the mounting strap 23 has an elongated opening 31 and a tapped opening 32. A fastening screw (not shown) fits through each elongated opening 31 for holding the mounting strap, and in turn the thermostat assembly, in a standard wall-mounted switch box (not shown). The tapped openings 32 are for receiving fastening screws 33 that fasten a trim member or escutcheon plate 34 over the fixed faceplate 11. In other words, this thermostat will be assembled as two parts. First, the main part will be fastened in a standard switch box by fastening screws fitted through the mounting strap 23. Then the trim member or escutcheon plate is added to hide any rough edges between the wall surface and the box.

Turning now to a discussion of the switch base 22 of FIGURE 4, four cylindrical bosses 35 will be recognized in the four corners of the front face thereof. These bosses are raised, as best seen in FIGURE 2, for receiving fastening screws 36 that hold the fixed faceplate 11 onto the base and allow room between the mounting strap 23 and the back of the fixed faceplate 11 to accommodate the control knob. The switch structure comprises a pair of fixed contacts 37 and a pair of movable contact blades 38 which are shown in detail in the exploded view of FIGURE 5. Each contact blade is stamped from thin sheet material, such as bronze or beryllium copper, into a channel shape in the transverse cross-section. This channel shape extends from the free end 39 of the contact to a point just short of the fixed end 40 to allow for the concentration of the bending forces adjacent the fixed end 40. These contact blades 38 are inherently biased against the fixed contacts 37 and each blade in addition is backed up with an auxiliary coil spring 41 as best seen in FIGURE 3. A rocker arm 42 of insulating material cooperates with the movable contacts 38 as an intermediate leverage means between the fluid-filled expansible element 43.

This expansible element 43 is disc-like in appearance as shown in FIGURE 5 and has two flexible diaphragm surfaces 44 that may move with respect to each other in response to variations in pressure of the liquid confined in the element and the reservoir. A small flexible tube 45 connects the element with the reservoir 13 on the fixed faceplate 11. A second flexible tube 46 is joined with the reservoir and it serves as a filler tube for the liquid; the end of which is flattened and sealed after the reservoir and element have been filled with the liquid. As best seen in FIGURE 2, the expansible element 43 includes a shoulder 47 on the side opposite the diaphragm 44. This shoulder terminates in a stud 48 that is assembled to and fixed within an externally threaded nipple 49 that is mounted on the back side of the control knob 18 at the center thereof and cooperates with the bushing 24. Accordingly, it will be understood that the control knob 18 and expansible element 43 are assembled first to the mounting strap 23 from opposite sides thereof, while the fixed faceplate 11 is only flexibly connected to the mounting strap through the tube 45. This relationship holds until the mounting strap 23 is fastened to the base 22 by means of screws 26 and 27 and until the fixed faceplate 11 is fastened to the bosses 35 of the base.

Returning to a consideration of the switch mechanism, and especially to FIGURE 3, there is seen a small calibrating screw 50 that is threaded through the back wall of the base 22. The inner end 51 of this screw is rounded to form a fulcrum for a conical seat 52 of the rocker arm 42. As best illustrated in FIGURE 5, the rocker arm is of generally T-shape with a narrow shank portion 53 and a cross bar 54. The movable contact blades 38 are spaced far enough apart so that the shank 53 of the rocker arm 42 will fit therebetween as is best seen in FIGURE 2. The cross bar of the rocker arm includes a narrow flange 55 along one edge for engaging the top of the contact blades 38. On the opposite side of the rocker arm is a semi-spherical bearing 56 as is best seen in FIGURE 3 to provide a universal point contact and allow a rocker action between the expansible element 43 and the rocker arm.

This switch mechanism is of the slow make and break type and breaks both sides of the circuit. It has been found during exhaustive experiments that the contacts have a tendency to weld together slightly when they close on a heavy load. This increases the spring rate of the contact blades to a very high value. The solution has been to design low ratios of contact blade length to force arm length. This contact welding factor and the understanding of the relation of spring rates to lever arm ratios has caused a radical change in the design of this mechanism over the prior art.

While the drawings do not illustrate the terminal means for the contacts of the switch, it will be readily apparent to those skilled in this art that such means must be provided for connecting the thermostat to both the line and the load. As far as this invention is concerned, the terminals may either be on the sides, the top or the back of the switch base 22, or they may be leads or pigtails.

The thermostat of this invention has shown remarkable results during exhaustive tests. It has demonstrated a closer temperature differential, faster response and greater insensitivity to load than any other thermostat of equivalent structure and cost. While an annular shaped reservoir has been chosen as the preferred embodiment of the present invention, it will be readily appreciated that other modifications may be used as acceptable substitutes. The annular shape is preferred because of its ease of manufacture and the quality of the resulting seal.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A radiant heat thermostat comprising a housing, a slow make and break switch structure enclosed in the housing, a fluid-filled expansible element bearing against the switch structure for controlling the actuation thereof, a control knob arranged outside the housing and having a portion that is adjustably mounted in one wall of the housing, the control knob being fastened to the expansible element so that the turning of the knob will alter the position of the expansible element, and a faceplate assembled over the wall of the housing to overlie the knob, a fluid reservoir combined with the faceplate and comprising a large surface area of the faceplate, a flexible tube joining the reservoir with the expansible element, whereby a change in temperature of the fluid in the reservoir will alter the pressure of the fluid and cause a reaction in the expansible element.

2. A radiant heat thermostat as recited in claim 1 wherein the said wall of the housing that supports the control knob comprises a mounting strap that extends beyond the faceplace so that fastening means may extend through the ends of the mounting strap for holding the thermostat upon a supporting structure, and a trim member extending over the faceplate and covering the mounting strap, the trim member being fastened in place.

3. A switch mechanism for a radiant heat room thermostat comprising a base with a pair of movable contact blades that are fastened to one side of the base for engaging a pair of fixed contacts at the opposite side of the base, each blade being of thin sheet material that is rigidized for a major portion of its length remote from the fastened end whereby all bending of the blades takes place closely adjacent the fastened ends, and a rocker arm fulcrumed near one end on an adjustable support in the base closely adjacent the fastened ends of the blades and bearing at its opposite end against both blades simultaneously at points closely adjacent the free ends of the blades, and a force member bearing against the rocker arm intermediate its ends more closely adjacent the said opposite end thereof, so that there is a low ratio of contact blade length to force arm length.

4. A switch mechanism for a radiant heat room thermostat as recited in claim 3 wherein each contact blade is rigidized along a major portion thereof by forming the blades with a channel-shaped transverse cross-section, and both the base and the rocker arm are of insulating material, while the force member is a fluid-filled expansible member which acts upon the rocker arm to open or close the circuits through the switch in response to variations of pressure of the liquid in the expansible member.

5. A radiant heat room thermostat comprising a housing, a slow make and break double pole switch mechanism enclosed in said housing, a fluid-filled expansible element associated with the switch mechanism for controlling the actuation thereof, a control knob adjustably mounted in one wall of the housing while the said expansible element is assembled on the opposite side of the said wall of the housing and is supported from the said knob so that turning of the knob will shift the position of the expansible element with respect to the switch mechanism, and a faceplate assembled over the front of the housing, the faceplate comprising a fluid reservoir of annular shape that is concentric with the center of the control knob, and a fluid connecting means between the reservoir and the expansible element whereby a change in temperature of the front of the faceplate will alter the pressure of the fluid and cause a reaction in the expansible element.

6. A radiant heat room thermostat as recited in claim 5 wherein the faceplate is assembled over the control knob, two of the opposite side edges of the faceplate being notched so that the control knob may extend therebeyond and be accessible for manual adjustment.

References Cited in the file of this patent
UNITED STATES PATENTS

| | | |
|---|---|---|
| 2,240,373 | Newton | Apr. 29, 1941 |
| 2,273,375 | Ray | Feb. 17, 1942 |
| 2,389,429 | Griffith | Nov. 20, 1945 |
| 2,488,459 | Weber et al. | Nov. 15, 1949 |
| 2,520,872 | Zuehlke | Aug. 29, 1950 |
| 2,739,204 | Garner et al. | Mar. 20, 1956 |
| 2,868,928 | Strobel et al. | Jan. 13, 1959 |